United States Patent
Tilbury (10) Patent No.: US 10,730,362 B2
(45) Date of Patent: Aug. 4, 2020

(54) VEHICLE RADIATOR ASSEMBLIES WITH COOLANT PATHS VIA MOVEABLE BLADES

(71) Applicant: Ford Global Technologies LLC, Dearborn, MI (US)

(72) Inventor: Robert John Tilbury, Clifton Springs (AU)

(73) Assignee: Ford Global Technologies LLC, Dearborn, MI (US)

( * ) Notice: Subject to any disclaimer, the term of this patent is extended or adjusted under 35 U.S.C. 154(b) by 81 days.

(21) Appl. No.: 16/181,992

(22) Filed: Nov. 6, 2018

(65) Prior Publication Data
US 2019/0143785 A1    May 16, 2019

(30) Foreign Application Priority Data

Nov. 14, 2017    (CN) .......................... 2017 1 1123831

(51) Int. Cl.
| | |
|---|---|
| *F01P 7/10* | (2006.01) |
| *B60H 1/00* | (2006.01) |
| *B60K 11/08* | (2006.01) |

(52) U.S. Cl.
CPC ..... *B60H 1/00328* (2013.01); *B60H 1/00764* (2013.01); *B60K 11/085* (2013.01); *F01P 7/10* (2013.01)

(58) Field of Classification Search
CPC ............ B60H 1/00328; B60H 1/00764; B60K 11/085; F01P 7/10

USPC ........................................................... 165/98
See application file for complete search history.

(56) References Cited

U.S. PATENT DOCUMENTS

| | | | |
|---|---|---|---|
| 4,714,408 A | 12/1987 | Abe | |
| 4,934,448 A | 6/1990 | Uemura et al. | |
| 5,732,666 A | 3/1998 | Lee | |
| 6,179,049 B1 * | 1/2001 | Higgins | ................ B21D 28/28 165/140 |
| 6,273,184 B1 * | 8/2001 | Nishishita | ............. F28D 1/0435 165/140 |
| 6,354,804 B1 | 3/2002 | Leung | |
| 8,714,290 B2 | 5/2014 | Kitashiba et al. | |
| 8,739,744 B2 | 6/2014 | Charnesky et al. | |
| 2017/0219297 A1 * | 8/2017 | Janezich | ............... F28D 7/0066 |

* cited by examiner

*Primary Examiner* — Davis D Hwu
(74) *Attorney, Agent, or Firm* — Geoffrey Brumbaugh; Kolitch Romano LLP (57) ABSTRACT

A radiator assembly in a vehicle comprises a first coolant tank; a second coolant tank spaced apart from the first coolant tank; a plurality of moveable blades; a linkage coupled to the plurality of blades; and an actuator coupled to the linkage to adjust positions of the blades. Each of the plurality of blades has a first end pivotally coupled to the first coolant tank, a second end pivotally coupled to the second coolant tank and has a hollow body portion extending between the first end and the second end, and each of the blades is fluidly communicated with the first and second coolant tanks to form a coolant passage.

20 Claims, 4 Drawing Sheets

VEHICLE RADIATOR ASSEMBLIES WITH COOLANT PATHS VIA MOVEABLE BLADES

RELATED APPLICATION

This application claims the benefit of Chinese Patent Application No.: CN 201711123831.8 filed on Nov. 14, 2017, the entire contents thereof being incorporated herein by reference.

FIELD

The present disclosure relates generally to a radiator assembly in a vehicle, in particular, relates to a radiator assembly with coolant paths passing through the moveable blades.

BACKGROUND

A radiator in a vehicle is a heat exchanger used for cooling an internal combustion engine. The radiator is typically mounted behind a front grille to receive airflow from the forward movement of the vehicle. The velocity of air flow across the radiator has a major effect on its ability to dissipate heat. Active grille shutters have been developed, which improve efficiency by opening and closing automatically to control airflow across the radiator. When they are opened, the shutters allow air to flow through the radiator and into the engine compartment to promote cooling. When the cooling is not needed, the shutters close and reroute air around the vehicle to lessen aerodynamic drag and reduce fuel consumption. During the engine start-up, closed shutters can reduce warm-up time in cold weather.

In the current active grille shutter systems, the grille shutter is separated from the radiator and is an addition to the traditional cooling system. The inventor has recognized that there is a need for a cooling system having a reduced cost and weight compared to the current cooling system with active grille shutters.

SUMMARY

According to one aspect, a radiator assembly in a vehicle is provided. The radiator assembly comprises a first coolant tank; a second coolant tank spaced apart from the first coolant tank; a plurality of moveable blades, a linkage coupled to the plurality of blades; and an actuator coupled to the linkage to adjust positions of the blades. The plurality of blades have a first end pivotally coupled to the first coolant tank, a second end pivotally coupled to the second coolant tank and has a hollow body portion extending between the first end and the second end. Each of the blades is fluidly communicated with the first and second coolant tanks to form a coolant passage.

In one embodiment, the radiator assembly further comprises a radiator controller to control the positions of the blades via the actuator in response to one of driving environment and an engine operation condition.

In another embodiment, the positions of blades are adjusted to a closed position, a fully open position and multiple partially open positions and the driving environment is one of a vehicle speed and a vehicle load, and an engine operation condition includes an engine temperature.

In another embodiment, the blades are disposed substantially parallel to each other.

In another embodiment, the body portion of the blade includes a narrow leading edge at a free end, a broad rear portion and a middle portion having a curved surface extending between the free end and an end opposite to the free end.

In another embodiment, the body portion of the blade includes an upper surface and a lower surface. The upper surface may convex and the lower surface may be convex from a broad rear portion until about a middle portion and then concave toward a leading edge at a free end.

In another embodiment, the controller is configured to adjust the positions of blades to a closed position, a fully open position and a partially open position. The plurality of blades contact each other to block an air flow between the blades at the closed position, and wherein planes passing through the blades are about zero degrees to a horizontal line to allow the air flow between blades with minimal resistance at the fully open position.

In another embodiment, the blade is made from aluminum via aluminum extrusion.

In another embodiment, the first tank and the second tank are connected to an upper support and a lower support, respectively to form a frame to enclose the plurality of blades.

In another embodiment, the actuator is a stepper motor.

In another embodiment, the linkage is an elongated rod coupled to the plurality of blades or the linkage includes a plurality of grid, each grid enclosing a corresponding blade at a cross-section.

In another embodiment, the radiator assembly further comprises a plurality of couplings to connect the plurality of blades to the first and second coolant tanks. Each blade includes a first endplate and a second endplate at the first end and the second end, respectively and the first and second end plates having a first hole and a second hole, respectively. The first coolant tank includes a first sidewall having a plurality of first apertures and the second coolant tank includes a second sidewall having a plurality of second apertures. Each coupling has a first end attached to a corresponding first aperture in the first sidewall or the second aperture in the second sidewall and a second end attached to the holes of the first endplate or the second endplate, respectively such that each blade is rotatable relative to the first sidewall and the second sidewall.

In another embodiment, the first end of coupling is integral with the endplates and the second end is moveably connected to the aperture in sidewall.

In another embodiment, the second end of coupling is integral with the sidewall and the first end is moveably connected to the endplate.

In another embodiment, the first coolant tank includes a coolant inlet and the second coolant tank includes a coolant outlet, and the coolant flows from the first coolant tank to the second coolant tank via the plurality blades in the same direction.

In another embodiment, the radiator assembly further comprises a third coolant tank having a coolant outlet and disposed at a same side of the first coolant tank. The first coolant tank includes a coolant inlet and the plurality of blades including a first group blades and a second group blades. The first group blades are fluidly communicated with the first and second coolant tanks and a coolant flows from the first coolant tank to the second coolant tank via the first group of blades. The second group blades are fluidly communicated with the second and the third coolant tanks, and the coolant flows from the second coolant tank to the third coolant tank via the second group of blades to exit the third coolant tank. A flow direction in the second group of blades is opposite to a flow direction in the first group of blades.

According to another aspect, a radiator assembly in a vehicle is provided. The radiator assembly comprises a first coolant tank and a second coolant tank disposed apart from each other; a plurality of blades pivotally coupled between the first coolant tank and second coolant tank and parallel to each other, at least one linkage coupled to the plurality of the blades; and an actuator coupled to the linkage to adjust positions of the blades; and a controller configured to adjust the positions of the blades via the actuator in response to a driving environment and an engine operating condition. At least some of the blades includes a hollow portion and is adapted to pass a coolant between the first tank and the second tank;

In one embodiment, the actuator adjusts the positions of blades to a closed position at which at least a portion of a blade overlays at least a portion of adjacent blade to block an air flow between the blades, a fully open position at which a distance between the blades is maximum and the blades are substantially in horizontal direction toward an incoming airflow to have a minimal resistance to an airflow, and multiple partially open positions there-between.

In another embodiment, the actuator adjusts the positions of blades to a closed position and a partially open position in response to a vehicle speed, and adjust the position of the blades at fully open position when the engine temperature is above a threshold.

In another embodiment, each blade is connected to sidewalls of the first and second tanks via a coupling. Each blade includes two endplates each having an opening; a sidewall of a first and second tanks having a plurality of apertures; and a first end of the coupling is pivotally attached to the aperture in the sidewall and a second end is pivotally attached to the opening in endplate.

The radiator assembly of the present disclosure includes moveable blades which can be positioned at different angels relative to a horizontal direction in response to an amount of air required for the cooling. That is, the blades are adjusted dynamically in response to driving environment, an engine load and/or an engine temperature. Comparing to the conventional cooling system with active grille shutters. The radiator assembly of the present disclosure reduce the weight and costs.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed radiator assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of radiator assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
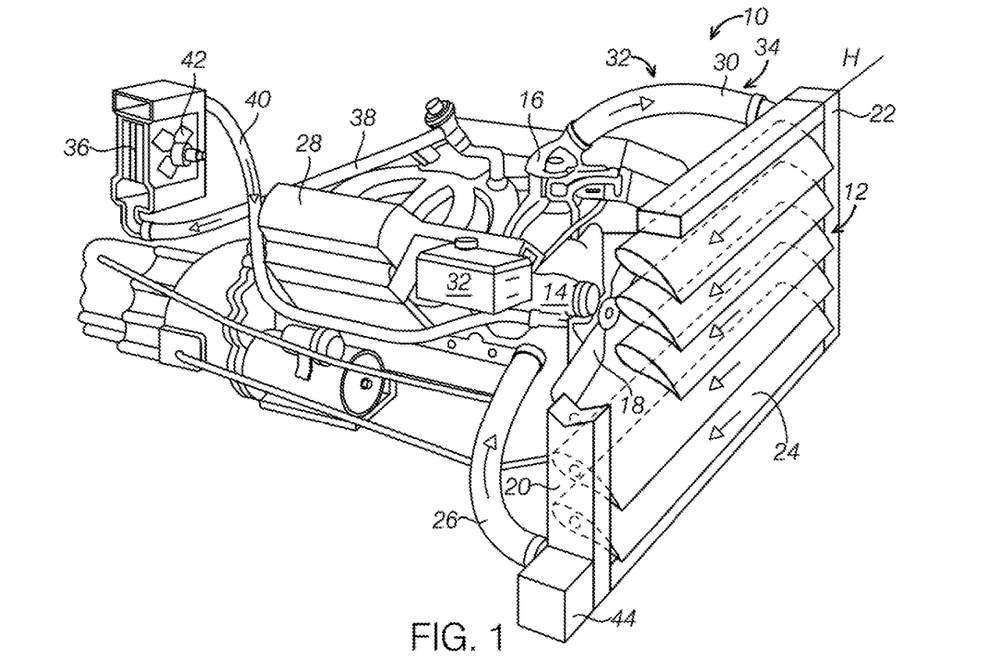
FIG. 1 is a schematic perspective view of a cooling system according to one embodiment of the present disclosure.

FIG. 1 is a schematic perspective view of a cooling system 10 in a vehicle according to one embodiment of the present disclosure. The cooling system 10 may include a radiator 12, a water pump 14, a thermostat 16 and a fan 18. The radiator 12 is a heat exchanger used for cooling an internal combustion engine. The radiator 12 may include a first coolant tank 20, a second coolant tank 22 and a plurality of blades 24. The blades 24 are hollow blades disposed between the first and second coolant tanks 20, 22 and communicated fluidly with the first and second coolant tanks 20, 22. In other words, the blades 24 are coolant passages. As shown in arrows, the coolant flows from the first coolant tank 20 to a lower hose 26 and enters in channels cast into an engine block 28 to carry away heat. The channels (not shown) may run through the engine block 28 and cylinder heads. The coolant is circulated in the channels in the engine block 28 and heated. The heated coolant exits the engine block 28, flows into an upper hose 30 and enters the second coolant tank 20 to flow into the blades 24. The water pump 14 may be used to force the coolant to circulate in the cooling system 10. As shown in FIG. 1, a coolant reserve tank 32 may be included in the cooling system 10. The coolant in the radiator 12, the lower hose 26, the channels in the engine block 28, and the upper hose 30 may form an engine coolant circuit 34.

In the coolant passages or the blades 24 of the radiator 12, the coolant dissipates the heat to the atmosphere and then return to the engine block 28. The coolant may be water or a mixture of water and antifreeze in proportions appropriate to the climate. Antifreeze usually comprised of ethylene glycol or propylene glycol with a small amount of corrosion inhibitor.

The radiator 12 is typically mounted in a position to receive airflow from the forward movement of the vehicle. For example, the radiator 12 may be mounted behind a front grille to achieve sufficient airflow. The fan 18 may be disposed behind the radiator 12 to force the air through the radiator 12. The fan 18 may be an axial fan.

The engine temperature may be controlled by the thermostat 16 disposed between the upper hose 30 and the engine block 28. In some embodiments, the thermostat 16 may be a wax-pellet type valve which opens once the engine has reached its optimum operating temperature. When the engine is cold, the thermostat is closed except for a small bypass flow. The coolant is directed by the thermostat 16 to the inlet of the water pump 14 and is returned directly to the engine, bypassing the radiator 12. In this way, the engine temperature reaches an optimum operating temperature as quickly as possible. Once the coolant reaches the thermostat's activation temperature, the thermostat 16 opens and allows the coolant flow through the radiator to prevent the temperature rising higher. The thermostat 16 may be configured to be constantly moving throughout its range, responding to changes in vehicle operating load, speed and external temperature, to keep the engine at its optimum operating temperature. In some embodiment, the cooling system 10 may further include a temperature sensor to measure the temperature of the engine so that the radiator 12 may be operated accordingly.

The cooling system 10 may further include a heater core 36 to circulate a portion of coolant. The heater core 36 is a small heat exchanger and may consists of conductive aluminum or brass tubing with cooling fins to increase surface area. Some of the coolant from the engine cooling circuit 34 is diverted through a heater core 36 via a heater hose 38. Hot coolant passes through the heater core 36 and gives off heat before returning to the engine cooling circuit 34 via a heater hose 40. A ventilation fan 42 forces air through the heater core 36 to transfer heat from the coolant to the cabin air, which is directed into the passenger compartment through vents at various points at an instrument panel.

The radiator 12 may include blades 24 which moves to various positions in response to driving environment to reduce air drag and improve fuel economy. The blades 24 may be driven by an actuator 44 and positioned at different angles based on the driving environment and/or the engine conditions. When a vehicle is towing a load or in a slow moving traffic, the blades 24 would remain open to help maintain the optimum engine temperature. In other words, the function of the active grille shutter is integrated into the radiator 12. For example, the blades 24 would be closed thereby pushing the air around the vehicle to improve aerodynamics during normal driving. The positions of the blades 24 may further be varied depending on an engine temperature. For example, the blades 24 may be closed during an engine start up so that the engine may reach the optimum operating temperature quickly.

Figure 2:
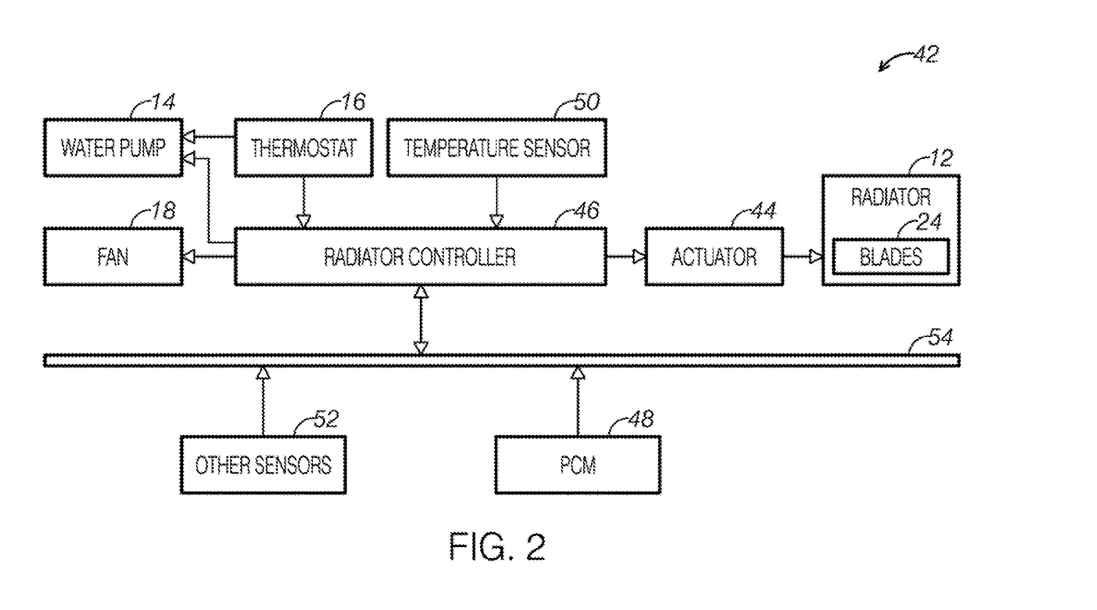
FIG. 2 is a block diagram of a radiator assembly according to one embodiment of the present disclosure.

FIG. 2 is a block diagram of a radiator assembly 42 according to one embodiment of the present disclosure, illustrating communications among the components of the radiator assembly 42. Referring to FIG. 2 and with further reference to FIG. 1, the radiator assembly 42 may comprise a radiator 12 as shown in FIG. 1. The radiator 12 includes a plurality of blades 24 rotatably connected to the first and second coolant tanks 20, 22. The blades 24 have hollow bodies and are used as coolant passages as illustrated in FIG. 1. The radiator assembly 42 may further comprise an actuator 44 and a radiator controller 46. The blades 24 may be rotated to one of a plurality positions by the actuator 44 in response to a command from the radiator controller 46 based on an engine condition and driving environment of a vehicle.

The radiator controller 46 may include a processor that provides for computational resources. The radiator control 46 may serve to execute instructions for software that may be loaded into a memory unit. The instructions may include program code, computer-usable program code, or computer-readable program code. In some embodiments, the radiator controller 46 may be an individual processor and communicated with various components to receive information and execute command or provide instructions. In some embodiments, the radiator controller 46 may be integrated with a powertrain control module (PCM) 48. The radiator controller 46 may receive information from a thermostat 16 or temperature senor 50 to obtain information on the engine operation condition such as an engine temperature in order to regulate an engine coolant circuit. For example, the temperature sensor 50 may measure the temperature of the engine directly or indirectly. When the engine temperature is lower such as at an engine start up, the radiator controller 46 may instruct the water pump 14 to circulate coolant in the channels of the engine block without passing through the blades and the coolant tanks in the radiator assembly. When the engine temperature is in an optimum range, the radiator controller 46 may instruct the water pump to circulate the coolant in the entire engine coolant circuit. Further, the radiator control 46 may instruct the actuator 44 to rotate the blades 24 in a closed position to avoid exchange with outside air at a cold weather condition such that the engine will reach the optimum temperature.

The radiator controller 46 may further receive information on an amount of cooling air required. The amount of air required may be determined on an engine load according to information from other sensors 52. The radiator controller 46 may receive the information from a bus 54. The other sensors 52 may be various sensors communicated with the PCM 48. The other sensor may include but not limited to an air intake sensor, manifold absolute pressure (MAP) sensor, a throttle position sensor (TPS) and an engine coolant temperature (ECT) sensor. Based on the information from the sensors, the radiator controller 46 may calculate the engine load and the amount of cooling air required. In some embodiments, the radiator controller 46 may receive information on the engine load and/or the amount of cooling air required directly from the PCM 48. In response to the engine load and/or the amount of cooling air required, the radiator controller 46 may regulate the positions of the blades 24 and set the blades 24 into multiple positions. For example, the blades 24 may be controlled to be closed to push the air around the vehicle to improve aerodynamics during normal driving. The reduction in air flow reduces drag, which in turn reduces the amount of energy needed to push the vehicle and increases gas mileage. If the vehicle is towing a load or slow moving in traffic and the engine gets hot, the blade may remain open or automatically reopen so that the needed air can reach the radiator 12 and help maintain the best engine temperature. The radiator controller 46 may further regulate the positions of the blades based on the engine temperature measured by the temperature sensor 50 or estimated from other engine-related parameters.

The blades 24 may be linked together and driven to different positions by the actuator 44 to allow different airflows across the radiator 12 and into the engine compartment based on the command from the radiator controller 46. Once rotated to the set position, the blades may stay until moved by the actuator 44 again.

The radiator controller 46 may further communicate with the fan 18 to adjust a speed of fan 16 in conjunction with the control on the blades 24. Further, the radiator controller 46 may control the operation of the water pump 14 based on the cooling need.

Figure 3:
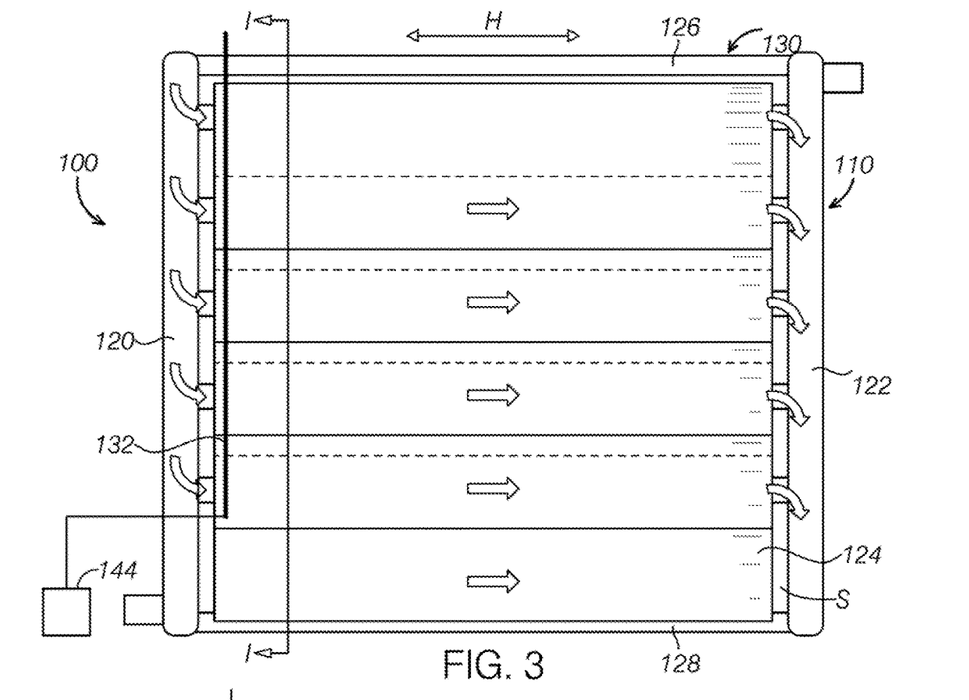
FIG. 3 is a front view of a radiator assembly according to another embodiment of the present disclosure.

FIG. 3 is a front view of a radiator assembly 100 according to one embodiment of the present disclosure, illustrating the blades 124 at a closed position. The radiator assembly 100 comprises a radiator 110 having a first coolant tank 120, a second coolant tank 122 spaced apart from the first coolant tank 120, and a plurality of blades 124. The radiator 110 may further include an upper support 126 and a lower support 128. The first coolant tank 120, the second coolant tanks 122, the upper support 126 and the lower support 128 form a radiator frame 130 and the plurality of blades 124 are disposed in the radiator frame 130. The blades 124 may be connected with each other via a linkage 132, and the linkage 132 is driven by an actuator 144. In the depicted embodiment, the linkage 132 is an elongated rod attached to each blade 124. The movement of the linkage 132 places the blades at multiple positions including a fully open position, a closed position and various positions between the fully open position and the closed position. At the closed position, a space defined by the radiator frame 130 are covered substantially by the blades. At the fully open position, a resistance to an incoming air is minimum to allow a maximum airflow pass through the blades 124.

In some embodiments, each blade 124 has a hollow body to form a coolant passage to allow coolant flow from the first coolant tank 120 to the second coolant tank 122 as shown by the arrows. Although each of the blades 124 have a hollow body in the depicted embodiment, it should be appreciated that other configurations are possible. For example, some of the blades are configured to have hollow body to form coolant passages and some the blades are solid body and used as shutters. For examples, the blades adjacent to the upper and lower support 126, 128 may have solid body and are configured to fit the radiator frame to provide flexible layout in the radiator frame 130 and reduce the manufacturing cost. It should be appreciated that the position of the hollow and the solid body may be disposed at any appropriate places in the radiator.

Figure 4A:
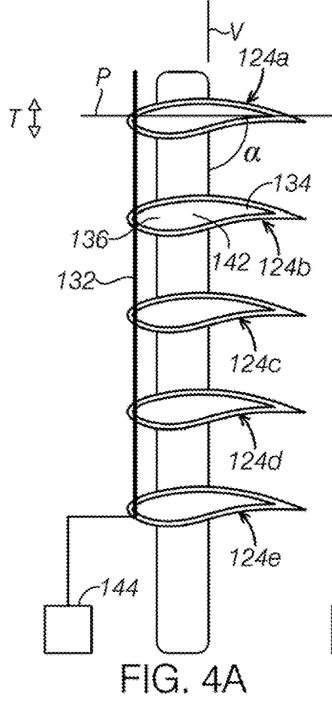
FIGS. 4A, 4B and 4C are side cross-sectional views of the radiator assembly in FIG. 3, illustrating the blades of the radiator in an open position, a partially open position and a closed position.
Figure 4B:
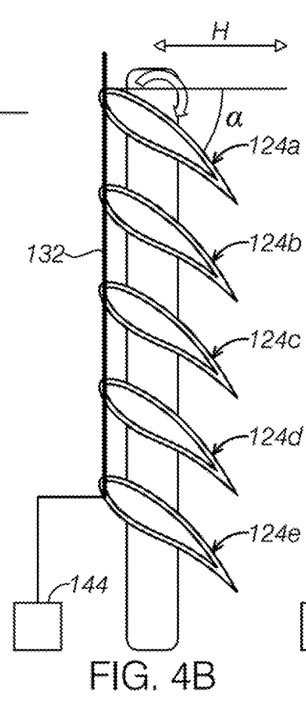
Figure 4C:
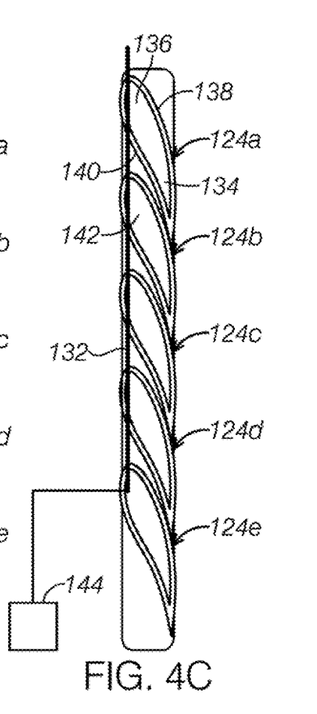

FIGS. 4A, 4B and 4C are side cross-sectional views of a radiator assembly 100, illustrating the blades 124 of the radiator 110 at an open position, a partially open position and a closed position, respectively. With further reference to FIG. 3, the blades 124 may be parallel to each other and disposed horizontally. At the closed position shown in FIGS. 3 and 4C, the blades 124 contact each other. For example, a free end 134 of a blade 124a at a higher position may touch a body of a, blade 124b. Similarly, the blade 124b touches a blade 124c, the blade 124c touches 124d and the blade 124d touches blade 124e. That is, the blades 124 substantially covers the space S define by the first coolant tank 120 and the second coolant tank 122 to block an air flow between the blades 124 at the closed position. The multiple blades 124 may be closed based on one of the engine condition, an engine load and driving environment. For example, when starting the engine from cold and the engine temperature is below a threshold, the blades may be placed at the closed position to help the engine reach the most efficient operating temperature quickly, which can reduce fuel consumption and emissions. In some normal driving conditions, the blades 124 may be closed to pushed air around the vehicle improve aerodynamics during the driving. In another example, when the vehicle travels at a certain speed and the cooling air is needed, the blades may be set to be partially open to allow the air coming into the radiator and the engine compartment.

It should be appreciated that the radiator 110 may have any numbers of blades depending on the configurations of the blades and the radiator frame. Further, the blades may be disposed parallel each other at a vertical direction.

At the fully open position illustrated in FIG. 4A, a plane P passing through the blade 124 may be parallel to a horizontal direction H or zero degree to a horizontal direction H such that the incoming air goes into the radiator 110 with a minimal flow resistance between the blades 124 to allow a maximum air flow.

The blades 124 may be positioned at various positions in response to one of driving environment, an engine load and an engine operation condition. Depending on the amount of air required for the cooling, the blade 124 may be placed at an angle α to a horizontal direction H. The angle α may change in a range of zero to about or almost 90 degrees, which would decrease when the required cooling air increases and increases as the required air decreases. As the required air varies, the blades 124 may be changed at multiple positions between the fully open position and a closed position depending on the driving environment, the engine load and/or the engine operation condition. For example, the radiator controller may set the blades into multiple positions depending on the amount of cooling air required. The radiator controller may determine the required positions based on a vehicle speed, a coolant temperature, an ambient air temperature and an air condition system pressure. For example, during some driving environment, the blades may be actuated to rotate down to decrease an air flow area between the blades to reduce the air drag. The driving environment may be the speed of the vehicle and the load of the vehicle. At a high vehicle speed, the blades 124 may closed to improve the aerodynamic performance of the vehicle. In some embodiments, the blades 124 may be automatically adjusted to multiple positions such as fifteen (15) positions or sixteen (16) positions by the radiator controller. In this way, sufficient air is supplied to the radiator 110 to meet the cooling requirements while better aerodynamics and better fuel economy are achieved via positioning of the blades in response to the driving environment, the engine load and/or the engine operating condition.

Continuing with FIG. 3 and FIGS. 4A-4C, the blades 124 may be connected together by the linkage 132. In the depicted embodiment, a lower blade 124d is connected to the actuator 144. The rest of the blades are attached to the linkage 132. The actuator 144 may be a stepper motor to enable a linear movement. When the actuator 144 moves, it activates the blade 124e, which in turn causes the rest of the blades to move. In the depicted embodiment, the actuator 144 is positioned adjacent to a lower support 128. It should be appreciated that the actuator 144 may be disposed at any appropriate positions.

The blades 124 may be configured to have streamline to facilitate air movement. As shown in FIG. 4C, in some embodiments, the blade 124 may include a narrow leading edge at the free end 134 and a broad rear portion 136 as viewed from the cross section. In one example as illustrated in the cross section view in FIGS. 4A-4C, an upper surface 138 is convex and a lower surface 140 is convex in the rear portion 136 until about a middle portion 142 and then concave toward the free end 134. In other words, the contour of the cross section of the blade 124 may be an elongated teardrop. It should be appreciated that the blades of the radiator may have any streamline configuration.

Figure 5:
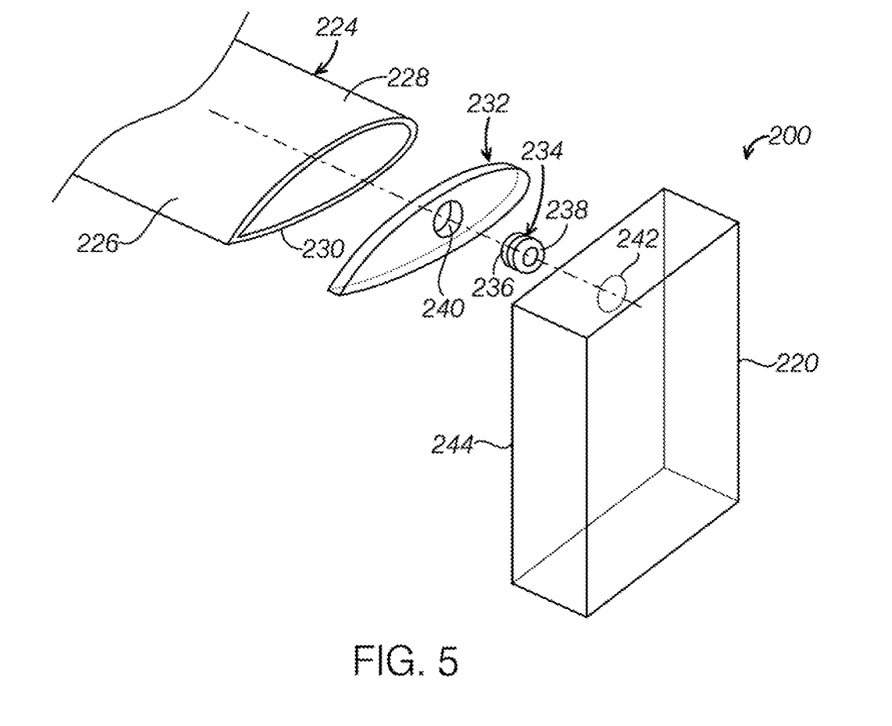
FIG. 5 shows an exploded partial view of a radiator according to one embodiment of the present disclosure, illustrating a connection between a blade and a coolant tank.

FIG. 5 shows a partial perspective view of a radiator 200 according to one embodiment of the present disclosure, illustrating connection between a blade 224 and a first coolant tank 220. The blade 224 may include a hollow body 226 which may be made by aluminum extrusion. An upper surface 228 and a lower surface 230 may have streamlined shape. A shape of a coolant flow area at the cross-section is defined by the upper and lower surfaces 228, 230 and has the similar contour to the upper and lower surfaces 228, 230. The blade 224 may further include an endplate 232 attached to an end of the hollow body 226.

The blade 224 may be rotatably connected to the first coolant tank 220 via a coupling 234. A first end 236 of the coupling 234 may be attached in a hole 240 in the endplate 232 and a second end 238 of the coupling 234 may be attached in an aperture 242 in an inner wall 244 of the first coolant tank 220. The blade 224 is rotatable relative to the coupling 234 or the sidewall 244 such that blade 124 can be moved by an actuator. In some embodiments, the first end 236 of coupling 234 is integral with the endplate 232 and the second end is moveably connected to the aperture 242 in the inner wall 244 of the first coolant tank 220. In some embodiments, the second end 238 of coupling 234 is integral with the inner wall 244 and the first end 236 is moveably connected to the endplate.

The inner wall of the hole 240 or an outer surface of the coupling 234 may be configured to possess required friction to retain the blade 240 at the set position after the driving force from the actuator is removed.

It should be appreciated that another end of the blade 224 may be rotatably connected to a second coolant tank via the coupling similarly. Further, it should be appreciated that the coupling in FIG. 5 is an example and any appropriated coupling devices may be used to rotatably connect the blade with the first and second coolant tanks.

Figure 6:
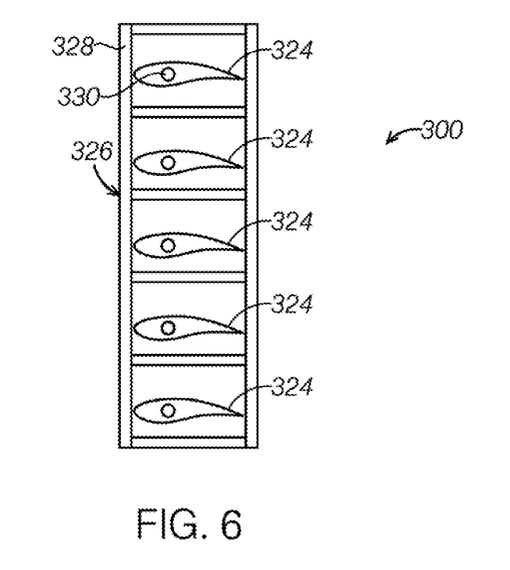
FIG. 6 is a cross-sectional view of blades and according to one embodiment of the present disclosure.

FIG. 6 is a cross section view of a radiator assembly 300 according to another embodiment of the present disclosure, illustrating a connection between a plurality of blades 324 and a linkage 326. The linkage 326 may include a plurality of grid 328, each enclosing one blade 324 from a cross sectional view and attaching the blade such that movement of the linkage 326 drives all blades 324. The linkage 326 is connected to and driven by an actuator and in turn transfer the movement to the blades 324. In the depicted embodiment, the hollow portion 330 may have a cylinder shape or an oval-shape cylinder and positioned at a center of the blades 324, which may be made from metal extrusion or die casting.

Figure 7:
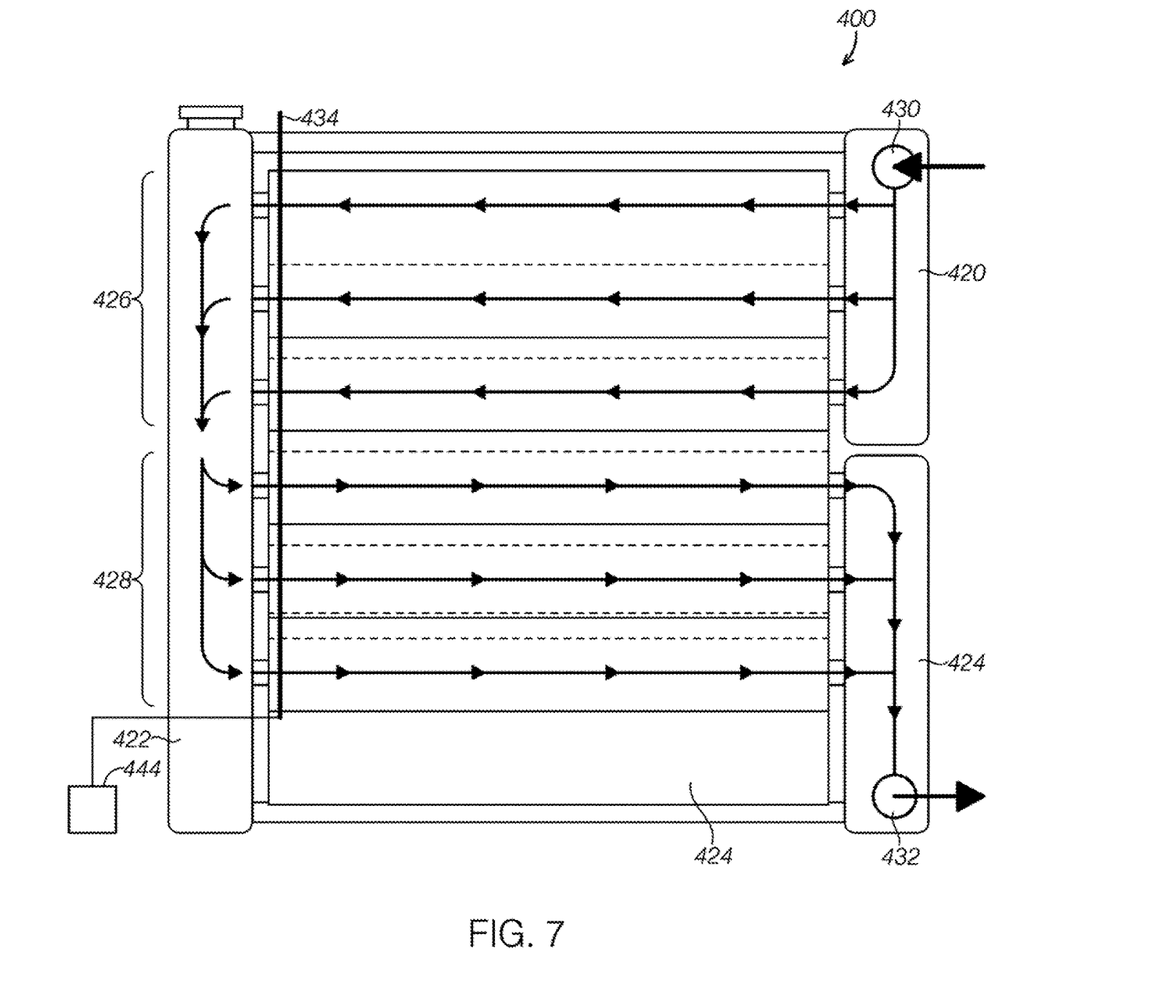
FIG. 7 is a front view of a radiator according to another embodiment of the present disclosure.

FIG. 7 is a front view of a radiator assembly 400 according to another embodiment of the present disclosure. The radiator assembly 400 includes a radiator controller to control a coolant flow and regulate the positions of blades, and an actuator to move the blades based on the command from the radiator controller. The radiator controller and the actuator in the radiator assembly 400 may have features similar to the embodiments described above associated with FIG. 1 to FIG. 4C. For the sake of brevity, the discussion on the radiator controller and the actuator will not be repeated and only different features are discussed. The radiator assembly 400 may include a first coolant tank 420, a second coolant tank 422 spaced apart from the first coolant tank 420, a third coolant tank 424 disposed at a same side of the first coolant tank 420, a first group blades 426 and a second group blades 428. The first group blades 426 are fluidly communicated with the first coolant tank 420 and the second coolant tank 422. The coolant enters the first coolant tank 420 from an inlet 430, passes through the first group blades 426 and arrives in the second coolant tank 422 as shown by the arrows. From the second coolant tank 422, the coolant passes the second group blade 428 and arrives the third coolant tank 424, and then exits the radiator via an outlet 432. A flow direction in the second group of blades is opposite to a flow direction in the first group of blades. In the depicted embodiment, the cooling path in the radiator is increased and thus improving the cooling efficiency.

In some embodiments, the first group blades 426 and the second group blades 428 may be connected to a linkage 434 and driven by an actuator 444 (not shown). As described above in association with FIG. 1 to FIG. 4C, the first and second group blades 426, 428 may be disposed at a closed position, partially opening positions and a fully open position by the actuator based on the command from the radiator controller. As the first group blade 426 and the second group blades 428 are connected to the same linkage 434, their rotations are synchronized and their angles to a horizontal line are the same at a set position. It should be appreciated that some blades may be fixed in some embodiments. For example, the first group blades 426 are connected to a linkage and moveable while the second group blades 428 are fixed. In some embodiments, only the second group blades 428 is connected to a linkage and moveable while the first group blades 426 are fixed. Configuration of moveable blades may depend on the position of the radiator in the vehicle, and the layout of an engine and other components to achieve desired aerodynamics while delivering the amount of air required for cooling the blades.

The radiator assembly of the present disclosure integrates the function of active grille shutters into the radiator. The moveable blades of the radiator function as coolant passages as well as active shutters. The positions of the blades vary based on an amount of air required by the cooling system. In this way, the cost of the cooling system and overall weight can be reduced while achieving the function of active shutter.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A radiator assembly in a vehicle, comprising:
   a first coolant tank;
   a second coolant tank spaced apart from the first coolant tank;
   a plurality of moveable blades, wherein each of the plurality of blades has a first end pivotally coupled to the first coolant tank, a second end pivotally coupled to the second coolant tank and has a hollow body portion extending between the first end and the second end, wherein each of the blades is fluidly communicated with the first and second coolant tanks to form a coolant passage;
   a linkage coupled to the plurality of blades; and
   an actuator coupled to the linkage to adjust positions of the blades.

2. The radiator assembly of claim 1, further comprising a radiator controller to control the positions of the blades via the actuator in response to one of a driving environment and an engine operation condition.

3. The radiator assembly of claim 2, wherein the positions of blades are adjusted to a closed position, a fully open position and multiple partially open positions and wherein the driving environment is one of a vehicle speed and an engine load, and the engine operation condition includes an engine temperature.

4. The radiator assembly of claim 2, wherein the blades are disposed substantially parallel to each other.

5. The radiator assembly of claim 2, wherein the body portion of the blade includes a narrow leading edge at a free end, a broad rear portion and a middle portion having a curved surface extending between the free end and an end opposite to the free end.

6. The radiator assembly of claim 2, wherein the body portion of the blade includes an upper surface and a lower surface, wherein the upper surface is convex and the lower surface is convex from a broad rear portion until about a middle portion and then concave toward a leading edge at a free end.

7. The radiator assembly of claim 2, wherein the controller is configured to adjust the positions of blades to a closed position, a fully open position and a partially open position, wherein the plurality of blades contact each other to block an air flow between the blades at the closed position, and wherein planes passing through the blades are about zero degree to a horizontal line to allow the air flow between blades with minimal resistance at the fully open position.

8. The radiator assembly of claim 1, wherein the blade is made from aluminum via aluminum extrusion.

9. The radiator assembly of claim 1, wherein the first tank and the second tank are connected to an upper support and a lower support, respectively to form a frame to enclose the plurality of blades.

10. The radiator assembly of claim 1, wherein the actuator is a stepper motor.

11. The radiator assembly of claim 1, wherein the linkage is an elongated rod coupled to the plurality of blades or the linkage includes a plurality of grid, each grid enclosing a corresponding blade at a cross-section.

12. The radiator assembly of claim 1, further comprising a plurality of couplings to connect the plurality of blades to the first and second coolant tanks, wherein each blade includes a first endplate and a second endplate at the first end and the second end, respectively and the first and second end plates having a first hole and a second hole, respectively; the first coolant tank includes a first sidewall having a plurality of first apertures; the second coolant tank includes a second sidewall having a plurality of second apertures, and wherein each coupling having a first end attached to a corresponding first aperture in the first sidewall or the second aperture in the second sidewall and a second end attached to the holes of the first endplate or the second endplate, respectively such that each blade is rotatable relative to the first sidewall and the second sidewall.

13. The radiator assembly of claim 12, wherein the first end of coupling is integral with the endplates and the second end is moveably connected to the aperture in sidewall.

14. The radiator assembly of claim 12, wherein the second end of coupling is integral with the sidewall and the first end is moveably connected to the endplate.

15. The radiator assembly of claim 1, wherein the first coolant tank includes a coolant inlet and the second coolant tank includes a coolant outlet, and wherein the coolant flows from the first coolant tank to the second coolant tank via the plurality of blades in the same direction.

16. The radiator assembly of claim 1, further comprising a third coolant tank having a coolant outlet, wherein the first coolant tank includes a coolant inlet, and the plurality of blades includes a first group blades and a second group blades, wherein the first group blades are fluidly communicated with the first and second coolant tanks and a coolant flows from the first coolant tank to the second coolant tank via the first group blades, wherein the second group blades are fluidly communicated with the second and the third coolant tanks, wherein the coolant flows from the second coolant tank to the third coolant tank via the second group blades to exit the third coolant tank, and a flow direction in the second group blades is opposite to a flow direction in the first group blades, and wherein the third coolant tank is disposed at a same side of the first coolant tank.

17. A radiator assembly in a vehicle, comprising:
   a first coolant tank and a second coolant tank disposed apart from each other;
   a plurality of blades pivotally coupled between the first coolant tank and second coolant tank and parallel to each other, wherein at least some of the blades includes a hollow portion and are adapted to pass a coolant between the first tank and the second tank;
   at least one linkage coupled to the plurality of the blades;
   an actuator coupled to the linkage to adjust positions of the blades; and
   a controller configured to adjust the positions of the blades via the actuator in response to a driving environment and an engine operating condition.

18. The radiator assembly of claim 17, wherein the actuator adjusts the positions of blades to a closed position at which at least a portion of a blade overlays at least a portion of adjacent blade to block an air flow between the blades, a fully open position at which a distance between the blades is maximum and the blades are substantially in a horizontal direction toward an incoming airflow to have a minimal resistance to the airflow, and multiple partially open positions there-between.

19. The radiator assembly of claim 17, wherein the actuator adjusts the positions of blades to a closed position, a partially open position and a fully open position and wherein the driving environment is one of a vehicle speed and an engine load, and the engine operating condition includes an engine temperature.

20. The radiator assembly of claim 17, wherein each blade is connected to sidewalls of the first and second tanks via a coupling, wherein each blade includes an endplate having an opening; a sidewall of a first and second tanks having a plurality of apertures; and a first end of the coupling is pivotally attached to the aperture in the sidewall and a second end is pivotally attached to the opening in endplate.

* * * * *